United States Patent [19]

Floyd et al.

[11] Patent Number: 5,026,746
[45] Date of Patent: Jun. 25, 1991

[54] STARCH BASED BINDER COMPOSITION FOR NON-WOVEN FIBERS OR FABRICS

[75] Inventors: William C. Floyd, Chester; louis R. Dragner, Rock Hill; Blanche H. Black, York, all of S.C.

[73] Assignee: Sequa Chemicals, Inc., Chester, S.C.

[21] Appl. No.: 371,493

[22] Filed: Jun. 26, 1989

[51] Int. Cl.$^5$ .......................... C08L 3/02; C08L 3/04; C08L 5/02; C08G 18/00
[52] U.S. Cl. ......................................... 524/50; 524/47; 524/48; 524/49; 524/52; 524/53; 527/300; 527/313; 527/314
[58] Field of Search ................... 524/47, 48, 49, 52, 524/53, 50; 527/313, 314, 300

[56] References Cited

U.S. PATENT DOCUMENTS

| | | | |
|---|---|---|---|
| 2,302,309 | 11/1942 | Glarum et al. | 524/47 |
| 3,061,471 | 10/1962 | Brockway et al. | 117/139.5 |
| 3,061,472 | 10/1962 | Brockway et al. | 117/139.5 |
| 3,719,514 | 3/1973 | Taylor | 524/47 |
| 3,785,921 | 1/1974 | Ide et al. | 524/53 |
| 4,011,392 | 3/1977 | Rudolph et al. | 536/108 |
| 4,135,943 | 1/1979 | Morishita et al. | 106/209 |
| 4,255,485 | 3/1981 | Yau | 524/52 |
| 4,295,846 | 10/1981 | Petersen et al. | 8/186 |
| 4,343,655 | 8/1982 | Dodd et al. | 106/214 |
| 4,375,535 | 3/1983 | Kightlinger et al. | 527/313 |
| 4,455,416 | 6/1984 | Floyd et al. | 528/245 |
| 4,488,950 | 11/1984 | Fanta et al. | 524/48 |
| 4,617,229 | 10/1986 | Larsson et al. | 428/284 |
| 4,695,606 | 9/1987 | Floyd et al. | 525/163 |
| 4,705,825 | 11/1987 | Symes et al. | 524/732 |

FOREIGN PATENT DOCUMENTS

| | | |
|---|---|---|
| 0147380 | 3/1985 | European Pat. Off. . |
| 0662809 | 10/1965 | France . |
| 186438 | 11/1981 | Japan . |
| 55-8087105 | 11/1981 | Japan . |
| 56-43312 | 12/1981 | Japan . |

OTHER PUBLICATIONS

"Arrangement of Repeating Units in Copolymers", chapter 9, pp. 250–251.
"Graft Polymer Formation", Chapet 17; pp. 710–719.
"Derivative Types & Reagents—Acyl Derivatives, Derivatives from Condensation Reactions", pp. 10–11.
George F. Fanta et al., "Grafted Starches", 1986 (Chapter 10); Modified Starches: Properties and Uses, ed. O. B. Wurzburg, CRC Press, Inc.

Primary Examiner—John Kight, III
Assistant Examiner—P. Hampton-Hightower
Attorney, Agent, or Firm—Mitchell D. Bittman

[57] ABSTRACT

A binder for non-woven fibers or fabrics is prepared comprising a starch-polymer graft, starch and a starch crosslinking agent. An acrylamide copolymer may optionally be included. The binder is useful for non-woven fibers such as a polyester fiber mat, and particularly single ply, bitumin roofing materials.

31 Claims, No Drawings

STARCH BASED BINDER COMPOSITION FOR NON-WOVEN FIBERS OR FABRICS

BACKGROUND OF THE INVENTION

The present invention relates to binders, more specifically, starch based binders for non-woven fibers such as polyester, polypropylene, fiberglass or cellulosic fibers.

Fibers, such as polyester fibers are often dry-laid to form a mat which is then fed through a pad bath to apply a binder which is then dried and cured. For roofing the binder-treated polyester mat is fed through a hot asphalt bath to apply a coating of asphalt. Due to the high temperature of the asphalt bath, polyester mats often stretch, resulting in a great decrease in the width of the mat.

Binders are known which reduce shrinkage of the mat width. Conventional binders comprise an acrylic or a vinyl-acrylic latex emulsion. For example, U.S. Pat. No. 4,617,229 describes a latex-type binder which is a mixture of methyl methacrylate and ethylacrylate and which is used to bind non-woven fabric for the carcass of a water-proofing membrane used in roofing.

Non-woven fabrics cover a wide array of products including consumer goods like mattress dust shields, disposable diaper cover fabrics, cleaning towels, carpets, draperies and industrial and commercial goods like wipe cloths, tire cords, conveyor belts, hospital fabrics, etc. The technology for non-woven production includes filament or staple filters processed through a dry or wet-lay sheet formation step and bonded by thermal, mechanical or chemical means. Laminations of non-wovens to other non-wovens, film sheets or traditional woven or knitted textiles are often still classified as non-wovens.

One of the non-woven bonding methods is to treat a staple or filament fiber sheet with an emulsion polymer containing a formaldehyde based crosslinking resin in order to impart water and solvent resistance When the emulsion is dried and cured the polymer forms intimate bonding of the fibers This polymer deposition modifies the strength, stiffness, environmental resistance, elongation and many other characteristics of the fiber fabric sheet. The fiber can be from a great variety of compositions, e.g. rayon, wood pulp (cellulose), cotton, nylon, polyester, glass and graphite In the case of carded staple fiber the polymer usually contributes most of the strength and toughness character in the resulting non-woven. In wet-laid wood pulp fiber products the polymer is able to provide the non-woven strength and resistance to aqueous and solvent environments which the untreated non-woven would not have. In glass mat non-wovens traditionally bonded with a urea-formaldehyde resin, addition of emulsion polymers alters the toughness of the resulting non-woven. Even in filament or staple fiber non-wovens which are bonded by mechanical (i.e. needle punching) or thermal (e.g. spun bonded) techniques and are formed into useful non-woven fabrics without a chemical treatment, an additional application of an emulsion polymer can enhance or produce other valuable characteristics such as stretch resistance or non-slip character.

Melamine-formaldehyde resins do not build viscosity in the binder until cured, but they have the disadvantage of having an unpleasant odor and of releasing free formaldehyde. Curing with such resins involves the crosslinking of binder molecule with the methylol or methylated methylol group of the melamine resin. Free formaldehyde can be released either directly from the binder or mixture or when the coating is cured on the drying machine. The presence of even less than one percent of free formaldehyde, based on the total weight of the product, is undesirable, not only because of its objectionable odor, but because it is an allergen and an irritant, causing severe reactions in the operators who manufacture the binders and who treat and handle the non-woven fibers or fabrics.

SUMMARY OF THE INVENTION

It is an object of the present invention to provide a binder for non-woven fibers, such as polypropylene, polyester, fiberglass or cellulostic fibers or fabrics.

It is a further object of this invention to provide a starch based binder.

It is another object of this invention to provide a non-formaldehyde starch based binder which provides good tensile strength, elongation properties and water resistance.

The foregoing and other objectives are achieved by providing a binder including a specific starch-polymer graft, starch and a starch crosslinking agent. An acrylamide copolymer may optionally be included in the binder. The binder is preferably prepared by grafting monomers onto starch to form the starch graft, then adding starch and the starch crosslinking agent. The starch of the starch graft preferably is a low molecular weight starch and the monomers of the starch graft are preferably acrylic, methacrylic or vinyl monomers.

DETAILED DESCRIPTION OF THE INVENTION

The binder of the present invention is a hybrid of a starch-polymer graft system and a starch/starch crosslinking agent system. The binder is a combination of a starch-polymer graft, a post graft starch and a starch crosslinking agent. The starch-polymer graft imparts superior room temperature tensile and anti-wicking properties to the binder. A unique feature of these starch-polymer graft latices is that they are compatible with gelatinized starch solutions. In contrast, conventional latexes tend to coagulate, separate or thicken when combined with starch. The starch and starch crosslinking agent on the other hand, greatly reduce stretching of polyester fibers at 180° C.

The binder of this invention also provides a starch system which is compatible with an acrylic latex and preferably provides a non-formaldehyde self-crosslinking resin with tensile strength equivalent to an all acrylic binder system but exhibiting less elongation and good water resistance. In addition, the binder system of this invention does not require or need a surfactant to provide a stable emulsion.

The particular starch-polymer graft is critical to the binder system. The starch is a hydrolyzate having a water solubility in excess of about 70% by weight at 25° C., preferably at least 86%, and a viscosity equivalent to a DE (Dextrose Equivalent) of 1-20, preferably 1-10 and includes at least one graft site where at least one monomer is bound to said starch hydrolyzate to form a starch-polymer graft compound, wherein the number of graft sites per mole of starch is in excess of about 1 millimole, preferably at least 10 millimoles, and wherein during or prior to the grafting reaction ring cleavage occurs between carbons 2 and 3 of the anhydro-glucose ring of the starch hydrolyzate. The binder containing the starch-polymer graft provides a stable, fluid aqueous emulsion without the use of surfactants and contains small particles in which agglomeration, coagulation and precipitation is inhibited. In a preferred embodiment of this invention, maltodextrins, preferably maltodextrins having a dextrose equivalent of between about 2 and 10 are utilized as the starch hydrolyzate onto which one or more hydrophobic monomers are grafted.

Aqueous emulsions prepared containing the starch-polymer graft contain small particles, generally less than 400nm, in which agglomeration, coagulation and precipitation is inhibited. The aqueous emulsions containing the starch-polymer graft also flow readily, i.e. they have a viscosity of less than 1000 cps, preferably less than 500 cps and optimally less than 250 cps, when measured at 30% solids, at room temperature and with a Brookfield viscometer (#3 spindle at 100 rpm).

The particular low molecular weight starch hydrolyzate is critical to the stability and other characteristics and properties of the starch-polymer graft and resultant binder containing such graft. The starch hydrolyzate has a water solubility in excess of 70% by weight at 25° C. and a viscosity equivalent to a DE of 1-20, but preferably has a water solubility of at least 86% and a viscosity equivalent to a DE of 1-10 to obtain an aqueous emulsion with increased stability, decreased precipitation and improved fluidity without the use of surfactants, as well as reduced particle size.

The low molecular weight starch hydrolyzate suitable for use in this invention can be obtained from a variety of starches and starch derivatives. Suitable starches include corn, waxy corn, milo, white milo, wheat, potato and tapioca. A preferred starch source is waxy maize because of reduced levels of sedimentation. Starch derivatives that can be used to prepare suitable low molecular weight starch hydrolyzates include hydroxyethyl starch ether, starch acetate, starch phosphate, starch maleate, starch propionamide, cationic starch, oxidized starch and cyanoethyl starch and in particular, hydroyethylated potato starch, cationic potato starch, acid modified corn starch, hydroxyethylated corn starch, oxidized corn starch and mixtures thereof. However, the invention is not limited to these. Other derivatives are also applicable. Methods for the conversion of starch and starch derivatives to the low molecular weight starch hydrolyzates suitable for this invention are known in the art. They include acid, enzyme, acid/enzyme, enzyme/enzyme converted starches and starch derivatives. Also included are certain dextrins (white dextrins, canary dextrins and British gums), thermochemically converted starches, and oxidized starches. Preferred starch conversion products are maltodextrins and dextrins. Generally the starch hydrolyzate prior to grafting has a cooked-out viscosity of less than 2000 cps, preferably less than 1500 cps, when measured at 40% solids and at room temperature with a Brookfield viscometer (#3 spindle, 100 rpm).

Particularly preferred are maltodextrins that have a DE within the range of about 2 to 10. Commercial maltodextrins are usually refined so that all insoluble carbohydrates and non-carbohydrate materials are removed. These refined maltodextrins are particularly desirable since aqueous emulsions of the starch-polymer grafts are stable, remain fluid and can be stored several months without significant sediment settling. Certain highly converted dextrins have solubility and viscosity characteristics comparable to these maltodextrins, and may likewise serve as suitable grafting substrates, and may thus be considered as being functionally equivalent to these starch hydrolysates.

The preferred monomers used in the grafting reaction, particularly when a stable aqueous emulsion is sought, are hydrophobic olefinically unsaturated monomers and include but are not limited to vinyl monomers, acrylic monomers, styrene monomers, methacrylic monomers and mixtures of the foregoing. Hydrophobic monomers are generally those which have a solubility of less then 10 grams in 100 milliliters of water at 20° C. For satisfactory aqueous emulsion stability generally at least 50%, preferably at least 85% by weight of the monomers are hydrophobic. Suitable hydrophobic monomer for making homopolymer or copolymer grafts include methyl acrylate, ethyl acrylate, propyl acrylate, butyl acrylate, 2-ethylhexyl acrylate, hydroxypropyl acrylate, methyl methacrylate, ethyl methacrylate, vinyl acetate and styrene and mixtures thereof. The monomer mix may contain hydrophilic monomers, preferably up to 15% by weight, of monomers such as acrylic acid, methacrylic acid, hydroxyethyl acrylate, acrylonitrile, quaternary salts of dimethylaminoethyl methacrylate and the like.

The ratio of monomer to starch (by weight) may be varied from about 1:50 to about 15:1, preferably from about 1:1 to about 7:1. Varying the monomer to starch ratio causes the properties of the resulting binder to vary greatly. Generally, high maltodextrin content, for example one having a monomer to maltodextrin ratio below about 2:1 produces, a binder having low elongation. Low maltodextrin content, for example a ratio above about 5:1 produces a binder having higher elongation.

The preparation of the starch-polymer graft and the stable, fluid aqueous emulsion is dependent upon a particular grafting reaction wherein ring cleavage occurs between carbons 2 and 3 in the anhydro-glucose ring of the starch. In addition to carrying out this grafting reaction, a suitable catalyst is determined by its ability to generate a high proportion of initiation sites on the starch backbone as opposed to generating initiation sites in the aqueous phase. Ceric salts ($CE^{IV}$), preferably ceric ammonium nitrate, meet this requirement. The preferred pH for the reaction with a ceric salt is 1.5-2.5. A temperature of less than 50° C. is preferred, especially a temperature of 25°-40° C. as higher temperatures at this low pH can degrade the starch. Nitric acid is preferred for lowering pH when ceric ammonium nitrate is used.

Alternatively, ring cleavage and grafting initiation can be carried out using separate reagents, i.e. the anhydroglucose ring can first be cleaved using periodic acid or other periodate or permaganate, followed by utilizing an initiation catalyst, such as a persulfate.

The starch-polymer graft may be prepared by a single feed process whereby all of the monomer is charged to a starch solution, and catalyst is added slowly, preferably over a period of about 30 minutes to about 6 hours. Polymerization may also be accomplished by a dual feed process wherein monomer and catalyst are fed simultaneously into the starch solution over an extended period. Additionally, a second polymerization may be carried out by adding additional monomers and conventional catalyst to the starch-polymer graft. Depending on the technique, a core-shell or interpenetrating polymer network may then be formed.

Preparation of the starch-polymer graft may be accomplished by charging water and an appropriate starch hydrolyzate into a reaction vessel. The initial solids content is preferably from about 20–50% by weight. In order to thoroughly disperse the starch hydrolyzate, the aqueous solution is preferably heated and stirred for a short period, preferably keeping the temperature below the boiling point of water. After the solution cools somewhat, the pH is adjusted and the vessel purged with an inert gas such as nitrogen. The monomers to be grafted are then charged into the reaction vessel. A catalyst solution is preferably added either subsequent to or substantially simultaneous with the addition of monomer.

Preferably, the catalyst comprises from about 0.1% to about 10% by weight of the monomer, most preferably from about 1% to about 4%. The catalyst solution is preferably added over a period of at least 30 minutes and preferably from about 1 to 2 hours. It is desirable to achieve a high molecular weight product while maintaining small particle size. By adding monomer and catalyst over a period of time, temperature rise may be closely regulated and maintained, preferably below about 40° C., and the resulting polymer will have a high molecular weight consistent with small particle size. Under more strenuous conditions where monomer and/or catalyst are added all at once, a lower molecular weight may result, as well as a much less uniform molecular weight range for the latex particles. Some of these reactions are highly exothermic and may require dual feeding of reactants to control the reaction. After all monomer and catalyst additions, and preferably after about 1½ to 2 hours of reaction time, a finishing catalyst may be added. Appropriate finishing catalysts include but are not limited to ferrous sulfate, t-butyl hydroperoxide, sodium bisulfite, ferrous ammonium sulfate hydrogen peroxide and sodium formaldehyde sulfoxylate. The batch is then briefly heated to consume residual monomer, then cooled and neutralized.

The starch-polymer graft thus prepared advantageously will provide a stable, fluid aqueous emulsion even at high solids contents of up to 30 to 50% without the use of surfactants. The average particle size of the graft is generally less than 400 nm, as measured on a Coulter ® Counter with a light scattering detector. Agglomeration, coagulation and precipitation from the emulsion is minimal. Advantageously, the emulsion flows readily such that that viscosity is less than 1000 cps, preferably less then 500 cps and optimally less then 250 cps as measured at 30% solids at 25° C. by a Brookfield viscometer (#3 spindle, 100 rpm). Uniquely, the aqueous emulsion obtained exhibits a high surface tension typically of 50–55 dynes/cm$^2$, as opposed to 25–40 dynes/cm$^2$ for a typical vinyl or acrylic emulsion containing surfactant. The benefit of a high surface tension is that the binder containing the starch-polymer graft emulsion will stay on the surface rather than soaking the substrate and if penetration of the substrate is desired it can be controlled by judicious additions of penetrating agents. High surface tension also will inhibit wicking or rewetting.

Starch is included in the binder in addition to the starch in the starch-polymer graft. This is a post graft starch which may be any of the known starches. Suitable starches may be obtained from any source including corn, waxy corn, red milo, white milo, wheat, potato and tapioca starches, but not limited thereto. Suitable starches for post addition to the starch-polymer graft in the binder include maltodextrins, dextrins and thin-boiling starches. Particularly suitable to this invention are thin-boiling starches that have been additionally chemically modified to reduce the setback or retrogradation tendencies of the starch. The prior art describes methods for making a wide variety of starch derivatives that display reduced setback. Because of low cost and effectiveness for reducing setback, preferably the starch is a thin-boiling starch derivative such as oxidized, enzyme converted, hydroxyethyl starch, starch phosphate, hydroxyethyl starch phosphate, starch acetate, starch propionamide and starch maleate. These derivatives may be used alone or in combination with thin-boiling starch, maltodextrins or dextrins to provide for a lower cost or to obtain desired viscosity characteristics.

In general, this post graft starch adds strength and minimizes elongation in products utilizing the binder. This starch should be compatible with the starch-polymer graft, have the ability to react readily with a starch crosslinking agent, such as a blocked glyoxal resin, in a crosslinking reaction, and have a high fluidity. Unmodified starch is less desirable as the post graft starch due to its high viscosity. The post-graft starch may be included in the binder at levels up to 10 times the amount of starch-polymer graft. The range of about 5% to about 80% by weight of the starch-polymer graft is preferred.

The crosslinking agent may be formaldehyde-based agents such as urea formaldehyde resins, urea, dimethylol dihydroxy ethylene urea-type resins, or melamine formaldehyde resins, but preferably is a non-formaldehyde starch crosslinking agent such as amonium zirconium carbonate or a glyoxal compound such as glyoxal or a blocked glyoxal resin. The preferred resin is a blocked glyoxal resin, preferably a cyclic urea/glyoxal condensate, cyclic urea/glyoxal/polyol condensate, glyoxal/polyol condensate or glyoxal/glycol condensate as described in U.S. Pat. No. 4,695,606. The crosslinking agent may be about 0.10% to about 25% based on total starch content in the binder on a dry basis. The preferred amount is about 9 to about 20% based on total starch content. The post graft starch and a starch reactive crosslinking agent may be added to the starch-polymer graft and the starch gelatinized, or the starch may be separately gelatinized with or without the crosslinking agent present and then added to the starch graft.

Preferably when a glyoxal compound is utilized, it is reacted with the post-graft starch. A glyoxal modified aqueous starch dispersion of the post graft starch is thus prepared which is readily flowable and wherein gelation and viscosity increases over time are inhibited. The starch dispersion is prepared by gelatinizing an aqueous dispersion of the post graft starch and reacting the starch with a glyoxal compound at temperatures of at least 70° C. Preferably gelatinization and the reaction with glyoxal are carried out simultaneously, although the starch can be pre-gelatinized then reacted with the glyoxal with heating.

It is theorized that by reacting gelatinized starch which contains amylose at the higher temperatures with glyoxal the amylose is derivitized with the glyoxal so that retrogradation of the amylose and the formation of amylose fatty acid complexes upon cooling is inhibited, resulting in aqueous dispersions having a flowable viscosity and in which gelation and viscosity increases over time are inhibited. Without intending to be bound by theory it is believed that the glyoxals react with amylose to make highly labile hemi-acetals which disrupt the crystallinity of amylose, thus significantly inhibiting retrogradation. Further, it is believed that glyoxal added after gelatinization and cool-down does not form hemi-acetals with the same efficiency as when added during heating because after gelatinization and cool-down crystallization occurs which limits the sites of reaction with glyoxal.

Preferably, the glyoxal compound is added to the aqueous starch slurry and the slurry is heated to about 90° C., for at least about 30 minutes to gelatinize the starch. The slurry may be cooked at higher temperatures such as by steam injection cookers if desired. The heat beneficially drives the reaction of glyoxal compound and starch simultaneously with causing gelatinization. The resulting gelatinized starch composition is then preferably treated with a biocide, preferably after it has been allowed to cool to about 60° C. Biocide is preferably added at a concentration by weight, of about 10 ppm to about 500 ppm. Suitable biocides include Kathon ®LX from Rohm & Haas which is a mixture of 5-chloro-2-methyl-4-isothiazolin-3-one and 2-methyl-4-isothiazolin-3-one and Proxel ®GXL from ICI which is 1,2 benzothiazolin-3-one. Gelatinization in the presence of glyoxal compounds preferably takes place in an aqueous slurry at a solids content between about 15% and bout 50% by weight, preferably between about 25% and about 35%. In alternative methods, dry starch and dry glyoxal compounds may be intermixed prior to introduction into an aqueous slurry for the gelatinization and/or reaction steps. The starch dispersion of the post graft starch thus prepared will generally have a viscosity of less than 1000 cps, preferably less than 350 cps, when measured in aqueous solution at 35% solids content (by weight) with a Brookfield viscometer (RV, #3 spindle at 100 rpm) and at room temperature.

Acrylamide and acrylamide copolymers can also be added to the binder, generally in amounts ranging up to about 5% of the binder on a dry basis, during the modification or gelatinization of the post graft starch to improve the properties of a binder resulting therefrom. The acrylamide produces improved dry and wet tensile strength in a polyester fiber mat utilizing the binder of the invention. The acrylamide is preferably a copolymer of acrylamide and methacrylic acid having a molar ratio of about 3 to about 1.

The invention is further illustrated by the following examples which are set forth only as illustrations of the invention and not as limitations thereof.

EXAMPLE I

A starch-polymer graft with a 5:1 monomer:starch ratio is prepared as follows. To 450 g of deionized water, 75 g of a maltodextrin (Maltrin ®M040, having a DE of 5, available from GPC) was charged in a 2 liter resin kettle. This was heated to 65° C. to completely dissolve the maltodextrin, then cooled under nitrogen to 20° C. The pH was adjusted from 3.8 to 2.1 with 5 g of concentrated nitric acid. As a strong nitrogen sparge purged the maltodextrin solution, 178 g of ethyl acrylate, 178 g of methyl methacrylate, 19 g of butyl acrylate and 0.19 g of triallyl cyanurate were mixed together and charged to a 500 ml addition funnel. Fifteen grams of ceric ammonium nitrate were dissolved in deionized water and charged to a 150 ml addition funnel. With the kettle temperature at 20° C., the monomer mix and catalyst solution were added simultaneously over a 1½ hour period. A slight exotherm was controlled by the addition of small amounts of ice to the cooling bath. After 10 minutes of addition the reaction product was a white opaque emulsion in appearance. After completion of the addition, the reaction stirred for one hour. The pH was adjusted to 6.5 with 13 g of 25% sodium hydroxide. As a preservative, five drops of biocide were added. The resulting product was a white emulsion with a slight bluish cast. Viscosity (Brookfield viscometer, #2 spindle at 100 rpm) at 45% solids and at room temperature was 80 cps.

EXAMPLE II

A post graft starch and starch crosslinker where added to the starch-polymer graft and reacted as follows. A portion of the starch-polymer graft of Example I (200 g) was placed into a 500 ml, 3-necked flask followed by 14 g of an ethoxylated potato starch (Polaris available from Penford Products), 50 g of water and 2 g of a cyclic urea/glyoxal condensate (Sequex ®R, a 2:1 ratio of glyoxal to cyclic urea, 45% solids, available from Sequa Chemicals Inc.). The reaction was slowly stirred and heated to 90° C. for 30 minutes, then cooled. The blue sheen of the starch-polymer graft was no longer evident. The product was a white emulsion, 40% solids, with a viscosity of 80 cps (Brookfield viscometer, #3 spindle at 100 rpm) at room temperature.

EXAMPLE III

A post graft starch and starch crosslinker were added to the starch-polymer graft and reacted as follows. A portion of the starch-polymer graft of Example I (200 g) was placed into a 500 ml flask followed by 28 g of Polaris Gum ®LV, 75 g of water and 4 g of Sequex ®R. The reaction was slowly stirred and heated to 90° C. for 30 minutes, then cooled. The product was a white emulsion, 40% solids, with a viscosity of 155 cps (Brookfield viscometer, #3 spindle at 100 rpm) at room temperature.

EXAMPLE IV

The samples prepared in Examples I-III were applied to a polyester fiber mat by drawing the mat through a pad bath at 15% solids followed by a nip roller, then dried and cured for 5 minutes at 350° F. and compared to a mat having a conventional acrylic latex binder (an emulsion copolymer of ethyl acrylate and n-methylol acrylamide containing surfactant). The results are shown below in Table I.

TABLE I

|  | Ex. I | Ex. II | Ex. III | Acrylic Latex Binder |
|---|---|---|---|---|
| % add-on | 21.40 | 22.80 | 22.90 | 22.10 |
| Wicking (mm) | 2.00 | 3.00 | 3.00 | 5.00 |
| Tensile strength at ambient temp. (Kg) | 28.99 | 28.54 | 28.54 | 28.22 |
| Percent stretch at 180° C. under: | | | | |
| 5 Kg load | 6.46 | 2.62 | 2.55 | 3.44 |
| 8 Kg load | 17.70 | 6.99 | 6.31 | 9.03 |

As illustrated in Table I, the starch graft alone, i.e., the mat having the binder of Example I, had sufficient dry tensile and wicking resistance, but had insufficient resistance to high temperature stretch, when compared to the mat having a conventional acrylic latex binder. The mats having the binders of Examples II and III illustrate that the incorporation of a post-graft starch and starch crosslinker, greatly reduces the percent of stretch at high temperature. These formulations shows superior performance compared to the conventional acrylic latex binder.

EXAMPLE V

The following binders were prepared in three runs (A-C) using the procedures of Examples I and II (all units of measure are the same as in Example I) with the acrylamide copolymer (a copolymer of acrylamide and methacrylic acid in a 3:1 molar ratio) and acid modified starch (Keofilm ®90, a 90 fluidity starch from Hubinger Company) being added with the cyclic urea/glyoxal condensate.

| Reactant | Run A | Run B | Run C |
|---|---|---|---|
| Maltodextrin | 5.7893 | 8.6840 | 7.3619 |
| Methyl Methacrylate | 7.0182 | — | 8.9244 |
| Ethyl Acrylate | 10.5215 | 26.3093 | 13.3794 |
| Triallyl Cyanurate | 0.0085 | 0.0128 | 0.0109 |
| Nitric Acid | 0.0714 | 0.1714 | 0.2180 |
| Ceric Ammonium Nitrate | 0.4858 | 0.7286 | 0.6177 |
| Sodium Hydroxide | 0.4000 | 0.4000 | 0.5087 |
| Ethoxylated Potato Starch | — | 8.6582 | — |
| Acid Modified Starch | 5.7722 | — | — |
| Acrylamide Copolymer | 0.3886 | 0.5829 | — |
| Cyclic Urea/Glyoxal Condensate (1:2 ratio) | 2.7376 | 4.1063 | — |
| Kathon ® LX (a biocide) | 0.0114 | 0.0114 | 0.0114 |
| Water | 66.6955 | 50.3351 | 68.9676 |
| Solids | 30 | 45.0 | 30 |
| Ratio of Monomer to Starch in Graft Starch | 3:1 | 3:1 | 3:1 |

The binders produced in runs A-C were also compared with a conventional acrylic latex binder as in Example IV. Mats using these binders were prepared as follows. A pad bath was prepared using each of the above binders at 15% solids. A polyester mat was padded in one dip and one nip, then dried and cured for 3.5 minutes at 400° F. (204° C). Wet pick up was 145% to achieve an add-on level of 22%.

The following tests were completed on each treated polyester mat. Room temperature tensile strength was determined on an Instron M1130, and percent stretch at 5Kg and 8Kg was also determined. Stretch was determined at 180° C. in the environmental chamber of the Instron Model 1130. Wicking was calculated by suspending a 15 cm × 5 cm sample of each mat vertically in 1 centimeter of blue-tinted water for 4 hours. The rise of color was measured. The results of these tests are tabulated below in Table II.

TABLE II

| | Mat Using Binder Of Run A | Mat Using Binder Of Run B | Mat Using Binder Of Run C | Mat Using Acrylic Latex Binder |
|---|---|---|---|---|
| Room Temperature Tensile Strength (Kg) | 29.03 | 28.09 | 28.25 | 28.22 |
| Percent Stretch at 180° C. under: | | | | |
| 5 Kg load | 2.146 | 2.381 | 5.720 | 3.436 |
| 8 Kg load | 5.373 | 8.121 | 17.090 | 9.027 |
| Wicking (mm) | 4.0 | 4.0 | 2.0 | 5.0 |

The binders of the present invention in Runs A and B as illustrated by the above Examples and Tables, produced mats with high tensile strength at both room temperature and higher temperatures. These mats also show improved water resistance. Furthermore, because of its thermosetting, self-crosslinking properties, a non-formaldehyde alternative is provided to urea-formaldehyde, phenol-formaldehyde, or melamine-formaldehyde resins in certain application, for example, hot oil filters or adhesives for plywood and particle board. The binders are also useful in single ply, bitumen roofing materials. The binder of Run C had no post-graft starch or crosslinking agent and the results show the inferior properties.

While certain representative embodiments and details have been shown for the purpose of illustrating the invention, it will be apparent to those skilled in this art that various changes may be made therein without departing from the spirit or scope of the invention.

What is claimed is:

1. A starch-based binder composition for non-woven fibers or fabrics which comprises:

a starch-polymer graft comprising a starch hydrolyzate having a water solubility in excess of 70% by weight at 25° C. and a viscosity equivalent to a dextrose equivalent of 1-20, wherein said starch hydrolyzate includes at least one millimole of graft sites per mole of starch hydrolyzate where the polymer is bound to said starch hydrolyzate to form the starch-polymer graft, and wherein during or prior to a grafting reaction which forms the graft the anhydro-glucose ring of the starch hydrolyzate is cleaved between carbons 2 and 3;

a starch; and a non-formaldehyde starch crosslinking agent.

2. Binder of claim 1 wherein the starch crosslinking agent is a glyoxal compound.

3. Binder of claim 2 wherein the starch has been gelatinized and reacted at temperatures above 70° C. in the presence of the glyoxal compound.

4. Binder of claim 3 wherein said glyoxal compound is selected from the group consisting of glyoxal and a blocked glyoxal resin.

5. Binder of claim 4 wherein said blocked glyoxal resin is a cyclic urea/glyoxal condensate.

6. Binder of claim 3 wherein said starch comprises dextrin or maltodextrin.

7. Binder of claim 3 wherein said starch comprises a hydroxyethylated starch and a maltodextrin or dextrin.

8. Binder of claim 7 wherein said hydroxyethylated starch is acid-modified or oxidized.

9. Binder of claim 3 wherein said starch is selected from the group consisting of dextrin, maltodextrin, hydroxyethylated potato starch, cationic potato starch, acid modified corn starch, hydroxyethylated corn starch, oxidized corn starch, enzyme converted starch and mixtures of the foregoing.

10. Binder of claim 3 further comprising a polymer or copolymer of acrylamide which is reacted with the starch and the glyoxal compound.

11. Binder of claim 3, wherein said composition is an aqueous emulsion with no added surfactant.

12. Binder of claim 11 wherein the starch hydrolyzate has a water solubility in excess of 86%.

13. Binder of claim 12 wherein the starch hydrolyzate has a viscosity equivalent to a dextrose equivalent of 1-10.

14. Binder of claim 13 wherein the starch hydrolyzate is a maltodextrin.

15. Binder of claim 1 wherein the starch hydrolyzate is a maltodextrin having a DE of 2-10.

16. Binder of claim 11 wherein the polymer is based on a monomer which contains at least 50% by weight of a hydrophobic, olefinically unsaturated monomer.

17. Binder of claim 15 wherein the polymer is based on a monomer which contains at least 85% by weight of a hydrophobic, olefinically unsaturated monomer.

18. Binder of claim 17 wherein the hydrophobic monomer is selected from the group consisting of vinyl, acrylic, styrene and methacrylic monomers, and mixtures thereof.

19. Binder of claim 18 wherein the starch hydrolyzate includes at least 10 millimoles of graft sites per mole of starch hydrolyzate.

20. Binder of claim 19 wherein said starch hydrolyzate before grafting has a cooked-out viscosity of less than about 2000 centipoise in a room temperature aqueous solution at a solids content of 40% by weight.

21. Binder of claim 11 wherein the aqueous emulsion has a viscosity of less than 1000 cps when measured at 30% solids, at room temperature and with a Brookfield viscometer with a #3 spindle at 100 rpm.

22. Binder of claim 13 wherein the aqueous emulsion has a viscosity of less than 500 cps when measured at 30% solids, at room temperature and with a Brookfield viscometer with a #3 spindle at 100 rpm.

23. Binder of claim 17 wherein the composition is an aqueous emulsion which has a viscosity of less than 250 cps when measured at 30% solids, at room temperature and with a Brookfield viscometer with a #3 spindle at 100 rpm.

24. Binder of claim 22 wherein the starch hydrolyzate is obtained from waxy maize.

25. Binder of claim 18 wherein the monomer is selected from the group consisting of methyl acrylate, ethyl acrylate, propyl acrylate, butyl acrylate, 2-ethylhexyl acrylate, hydroxypropyl acrylate, methyl methacrylate, ethyl methacrylate, vinyl acetate, styrene and mixtures thereof.

26. Binder of claim 10 wherein the copolymer is a copolymer of acrylamide and methacrylic acid.

27. Binder of claim 26 wherein the ratio of acrylamide to methacrylic acid is about 3 to about 1.

28. Binder of claim 1 wherein the starch is present in the composition in the amount of about 5 to about 80% by weight of the starch-polymer graft.

29. Binder of claim 28 wherein the starch crosslinking agent is present in the composition in an amount between about 0.10 to about 25% of the total starch content of the composition on a dry basis.

30. Binder of claim 2 wherein the starch crosslinking agent is present in the composition in an amount between about 9 to about 20% of the total starch content of the composition on a dry basis.

31. Binder of claim 14 having a solids content of 30 to 50%.

* * * * *